United States Patent Office 3,274,591
Patented Sept. 20, 1966

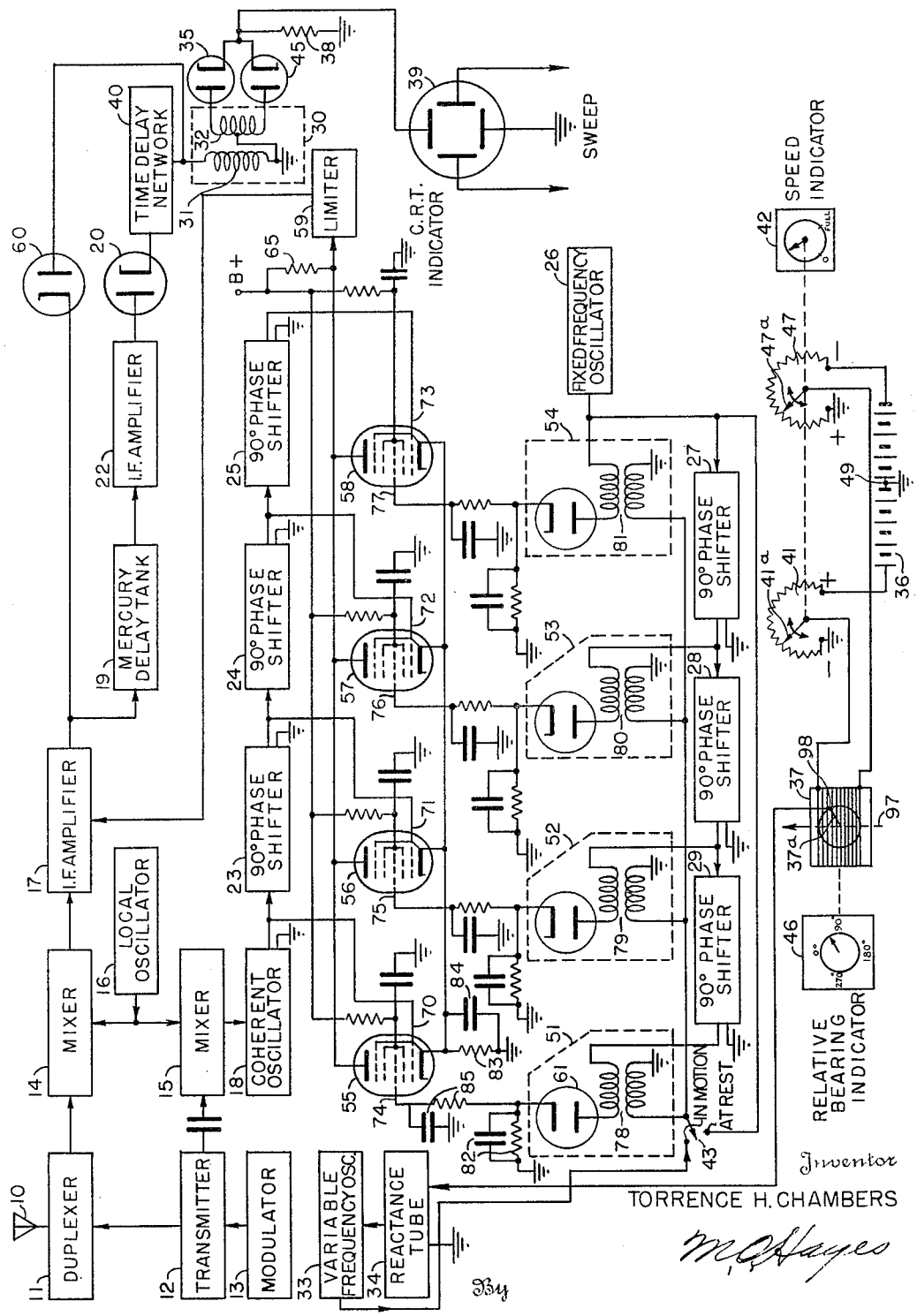

3,274,591
PHASE ROTATION SYSTEM FOR USE IN VELOCITY CANCELLATION MOVING TARGET RADAR SYSTEMS
Torrence H. Chambers, 3729 S St. SE., Washington, D.C.
Filed May 8, 1947, Ser. No. 746,847
7 Claims. (Cl. 343—7.7)

The invention described herein may be manufactured and used by or for the Government of the United States of America for governmental purposes without the payment of any royalties thereon or therefor.

This invention relates to echo-ranging systems for detection of moving objects and in particular, it relates to a system for correcting for motion imparted to the echo-ranging transmitter.

The pulse comparison technique of detecting moving objects by radio echoes has been the subject of extensive development and study, and it has given promise of being the most flexible and widely useful method of moving object detection. Its basic principle of operation involves delaying the echo signals resulting from one transmitted pulse by an interval precisely equal to the pulse repetition period of the system, whereby a direct comparison of such delayed echo signals with echo signals resulting from the next succeeding transmitted pulse is made possible. Accordingly, echo signals produced by any given object remaining at a fixed range from the system will cancel. If, however, the range of an object returning an echo signal changes during the interval between successive transmitted pulse, the phase of the echo signal produced by such object and resulting from successive transmitted pulses will experience a rotation, the sense and rate of which is governed respectively by the direction and speed of the movement of the object relative to the indicator system. In this event the resulting echo signal will not cancel, and an indication of the presence of a moving object will be had.

Experience has taught, however, that detection of moving objects by means of pulse comparison techniques, as herein described, can best be accomplished on an amplitude comparison basis. For this purpose, the phase rotation of an echo signal produced by a moving object must be converted into a signal whose amplitude varies as a function of the phase rotation of the echo signal. Such a signal may be obtained by vectorially combining the echo signal with a locally generated signal of fixed phase relation. The latter, as will hereinafter be described in detail, is produced by an oscillator known to the art as a "coherent oscillator."

From the foregoing it is apparent that in order to distinguish between echoes from moving and stationary objects, the transmitter sending out the echo-ranging pulses must be stationary, or must appear to be stationary with respect to the returning pulse even though the position of the transmitter is changing. Otherwise, the reflecting object will appear to be moving whereas actually it may be stationary. For example, if the transmitter is moving directly toward the reflecting object with a certain speed, the phase of the reflected pulse will experience a rotation at a rate depending upon the speed at which the transmitting source is moving. But if, instead of moving directly toward the reflecting object, the transmitting source be moving at the same speed as above but at an angle toward the reflecting object, then it may be seen that the speed at which the transmitting source is approaching the reflecting object will depend on the angle of its movement with respect to that object. This angle, then, will also determine the phase rotation of the echo signals. It will be seen, then, that the movement of the indicator system in the same manner as the movement of an object will cause the phase of the echo signal to rotate, and thereby cause the vector resultant of the echo signal and the coherent oscillator signal to vary in amplitude. Consequently, to nullify the phase rotation of the echo signal due to the movement of the indicator system, the phase of the coherent oscillator is rotated, by means hereinafter described, in a sense and at a rate determined by the direction and speed of the movement of the indicator system relative to the target under consideration.

It is an object of this invention to provide, for an echo-ranging system employing pulse comparison for detection of moving objects, a means for compensating for the movement of the transmitting source.

It is another object of this invention to provide, for such a system, a means for compensating for the directional motion that the transmitting source may have with respect to the reflecting object.

It is another object of this invention to provide a novel electronic circuit for producing phase rotation.

Other objects and features of the present invention will become apparent upon a careful consideration of the following detailed description when taken together with the accompanying drawing, the single figure of which illustrates one embodiment of the invention as employed in an echo-ranging system adapted for moving-object detection.

Referring to the drawing, a directional antenna 10, employed for both transmission and reception purposes, is coupled through a duplexer 11 to the receiver mixer 14 and to the radar transmitter 12. The output of transmitter 12 is loosely coupled to a second mixer circuit 15. Power is supplied in intermittent pulses to transmitter 12, by a suitable modulator 13. A stabilized local oscillator 16, similar to the conventional superheretodyne local oscillator but carefully designed for good frequency stability, is coupled to both mixer 14 and mixer 15 to convert the outputs thereof to a suitable intermediate frequency. The output of the second mixer 15 is applied to a coherent oscillator 18, tuned to operate at the intermediate frequency of the system, so that each time the transmitter is pulsed the oscillator 18 will be shocked into a fixed phase with the transmitted pulse and will continue in this phase until the next succeeding pulse. The output voltage from the coherent oscillator 18 is compared in phase and vectorially combined with the output from mixer 14 in the intermediate frequency amplifier 17. As will be hereinafter described, the connection between the coherent oscillator 18 and the I.F. amplifier 17 includes the compensating system of the present invention.

The output of intermediate frequency amplifier 17, which comprises the amplified vector sum of the voltages from mixer 14 and coherent oscillator 18, is split into two channels, one of which comprises diode 60. The other channel comprises a mercury delay tank 19, an amplifier 22, diode 20 and delay line 40. The delay provided by the mercury tank 19 and line 40 is set to equal one repetition period, whereby the output of the two channels, which are recombined in the primary winding 31 of the transformer 30, may be such that the instantaneous echo signals from the first channel may be balanced against the delayed output from the second channel as hereinbefore described. The intermediate frequency amplifier 22 is carefully adjusted to have a gain precisely equal in magnitude to the attenuation of delay device 19 so that the signals applied to diodes 20 and 60 are normally equal. Diodes 20 and 60 are connected to give output voltages of opposite polarity; that is, in this embodiment diode 20 is connected to deliver positive voltage to its load while diode 60 is connected to deliver negative voltage to its load. The terminals of the secondary winding 32 of transformer 30 are connected in a conventional full wave rectifier circuit comprising diode 35 and diode 45. The rectifier output is taken across the resistance 38 connected between the common cathode connection of diodes 35 and 45 and ground. Whenever the succeeding echo pulse currents through diodes 20 and 60 do not balance, a positive voltage will appear across resistance 38 which may be applied to a cathode ray tube indicator 39, as shown. If the cathode ray tube is supplied with a sweep in synchronism with the transmitter 12, indications thereon may be used to measure the range of moving targets.

The system as thus far described will detect the presence of relative motion between the transmitter and the reflecting object. However, motion of the transmitter as well as motion of the reflecting object will produce phase rotation as between successive echo signals. Therefore, if the phase of the coherent oscillator output is rotated with respect to the transmitted pulse at the same rate but of opposite sense as the phase rotation produced in the echo signals solely by the motion of the transmitter, the system will detect and indicate relative motion produced solely by the motion of the reflecting object.

According to the present invention the output of the coherent oscillator 18 is applied in parallel to the control grids of four phase rotation tubes 55, 56, 57, and 58. This connection is completed through three serially connected phase shifters 23, 24, and 25. Said phase shifters are arranged so as to accumulate the respective shifts in phase through the series connection, each adding an additional 90° shift in phase. The coherent oscillator output is applied directly to tube 55, through one phase shifter 23 (90°) to tube 56, through two phase shifters 23 and 24 (180°) to tube 57, and through all three phase shifters (270°) to tube 58. The coherent oscillator output is therefore impressed in phase quadrature on the control grids of the four tubes 55, 56, 57, and 58 respectively. Said control grids are indicated as 70, 71, 72, and 73 respectively in the drawing.

The phase rotation tubes may be considered as normally biased nonconducting but are rendered conducting in succession by a control voltage which is produced as a function of the relative motion between the reflecting object and the transmitter produced by the motion of the transmitter. Said control voltage, discussed in detail below, is applied to the respective second control grids 74, 75, 76, and 77 of said phase rotation tubes. The cathodes of said tubes connect to ground through a common cathode bias network comprising resistor 83 and condenser 84 in parallel. Said network is chosen to permit conduction only in the one or two tubes receiving the strongest signals on their respective second control grids. Said tubes also have a common plate loading resistor 65, across which the coherent oscillator signal is reproduced with a phase determined at any instant by the particular phase rotation tube or tubes then rendered conducting. The signal so produced at resistance 65 is passed through a limiter circuit 59 to the I.F. amplifier 17 where it is vectorially compared in phase with said received echo signal. The limiter circuit 59 insures a constant coherent oscillator output as applied to the I.F. amplifier and removes there from any modulation component produced by the control signal.

It therefore is seen that by rotating the conduction of tubes 55, 56, 57, and 58 at a rate and in a sense consistent with the relative motion caused by transmitter motion, the coherent oscillator signal can be given a rotating phase suitable to cancel the rotating phase produced in the consecutive echo signals by transmitter motion.

To apply a control voltage successively to the second control grids of the phase rotation tubes at the proper rate requires a means of feeding relative motion intelligence into the system. This is accomplished automatically by combining a voltage responsive to velocity with a voltage responsive to relative bearing. The voltage responsive to velocity is produced in a pair of rotary potentiometers, 41 and 47, which are energized at corresponding terminals from the opposite terminals of a battery 36. The other terminals of each potentiometer and the center tap 49 of the battery 36 are tied to ground. The battery 36 is chosen so that the voltage range of the potentiometers 41 and 47 will be ample to simulate the velocity range of the system. The potentiometer rotors 41a and 47a are ganged together and mechanically driven, for example, by a remote speed indicator 42 to produce a voltage proportional to velocity.

The voltage responsive to relative bearing is produced by a sinusoidal card potentiometer 37 whose opposite ends are connected to said potentiometer rotors 41a and 47a and which receives its energization therefrom. The card potentiometer rotor 37a is ganged with a relative bearing indicator 46 which may be synchronously driven with the scanning of antenna 10 by means of a servo system not shown. A voltage is produced between ground and the rotor brush 98 of the card rotor 37a which is a function of the sine of the angle between the line of motion 97 of the system and the reflecting object (the relative bearing). And since the card potentiometer is energized by a voltage proportional to velocity, the voltage at brush 98 is therefore commensurate with the relative motion produced by motion of the system. The two rotary potentiometers 41 and 47 supply the sinusoidal card potentiometer with a voltage varying equally either side of ground in response to changes in velocity.

To translate the output voltage of said card potentiometer 37 to signals providing rotary conduction in the phase rotation tubes 55, 56, 57, and 58, the voltage from said brush 98 is fed to a reactance tube 34 which controls the frequency of an oscillator 33. The output of this oscillator is compared in phase with that of a stable or fixed frequency oscillator 26 operating in the audio range. The variable oscillator 33 oscillates at the frequency of the stable oscillator 26 when zero voltage is applied to the reactance tube 34 and may vary in frequency either above or below that of the stable oscillator as determined by the signal applied to said reactance tube.

It will be easily understood by those versed in the art that there will be a constantly changing rotating phase difference between the outputs of the two oscillators whenever their respective frequencies differ even if the difference in frequency is constant, and the rate of rotation of this phase difference will be determined by the frequency difference.

The stable frequency oscillator output is applied to three serially connected phase shifters 27, 28, and 29 in the manner described in connection with the coherent oscillator to produce four signal components in phase quadrature. These phase quadrature components are separately applied to four detector circuits 51, 52, 53, and 54, where each is compared with the output of the variable oscillator 33. The respective signals may be compared by applying each to separate windings of a transformer 78, 79, 80, and 81, associated with each detector circuit. One of the windings of each transformer is connected at the end opposite its oscillator connection to the plate of a diode typified by tube 61 in detector 51. The cathode of each of the diodes is connected to ground through a suitable resistance capacitance filter network typified at 82 in the first detector circuit 51, and to the second control grid of the corresponding phase rotation tube through a corresponding filter circuit typified at 85. Conduction in any detector diode occurs whenever its plate potential is sufficiently positive. The magnitude of the diode plate potential is determined by the resultant vector of the two oscillator signals in the respective diode transformers 78, 79, 80, and 81.

For any frequency difference between oscillators 26 and 33 a proportionate rate of phase variation will occur. Conduction among the detector circuits 51, 52, 53, and 54 will therefore rotate in accordance with the frequency difference. This rotation will be passed on to their respective phase rotation tubes and a rotating phase is thereby applied to the coherent oscillator signal which is commensurate with the transmitter induced relative motion.

If the transmitter is stationary, the two oscillators 33 and 26 compared in the detector circuits 51, 52, 53, and 54, will be of the same frequency but not necessarily the same phase. As determined by the phase, one or more of the detector circuits will be conducting, but since the phase relation is not varying, the same detector will remain conducting. Similarly, the related phase rotation tubes will conduct and the coherent oscillator output will be shifted in phase. But the phase of the coherent oscillator output will not rotate and hence will add no artificial effect of motion to the received signal.

To insure that no rotating phase signal will be presented when the system is at rest, a switch 43 may be inserted in the input of the variable oscillator 33 to the detector circuits 51, 52, 53, and 54. When the system is in motion said switch 43 should be placed in the "in motion" position whereby the variable oscillator output is applied to the detector circuits as described above. Placing said switch in the "at rest" position removes the variable oscillator signal and applies the stable oscillator signal to the detector circuits whereby no compensation for motion is produced. For automatic control said switch 43 could be replaced by a relay arranged to close the "in motion" contacts whenever a signal is applied to the reactance tube 34, or such a relay could operate to lock-in the variable oscillator 33 with the stable oscillator 26 when no signal is applied to tube 34.

It will be understood that the embodiment of the invention herein shown and described is exemplary only, and that the scope of the invention is to be determined with reference to the appended claims.

What is claimed is:

1. In an echo-ranging system for detecting moving objects by comparing consecutive echo pulses after they have been vectorially added with a locally generated signal having a fixed phase relationship to the transmitted pulse, compensating means for balancing out the component of relative motion between the system and an object produced by motion of the system comprising, an oscillation generator coherent to the system for providing said locally generated signal, three phase shifting means serially connected thereto and reproducing said generator's output in phase quadrature components, four normally non-conducting vacuum tube amplifier means respectively receiving said generator output in phase quadrature, a mutual output means therefor, means for sequentially triggering said vacuum tube amplifiers at a rate in accordance with said relative motion produced by motion of the system, said last named means comprising a fixed frequency oscillator and a variable frequency oscillator, the frequency of said variable frequency oscillator being varied in accordance with said component of relative motion produced by the motion of the system, and means for controlling the rate of sequential triggering of said vacuum tube amplifiers in accordance with the frequency difference between said fixed and said variable frequency oscillators, and means for combining the output of said mutual output means with the echo pulses.

2. In an echo-ranging system for detecting moving objects by comparing consecutive echo pulses after they have been vectorially added with a locally generated signal having a fixed phase relationship to the transmitted pulse, compensating means for balancing out the component of relative motion between the system and an object produced by motion of the system comprising, an oscillation generator coherent to the system for providing said locally generated signal, three phase shifting means serially connected thereto and reproducing said generator's output in phase quadrature components, four normally non-conducting vacuum tube amplifier means respectively receiving said generator output in phase quadrature, a mutual output means therefor, a second and third oscillation generator having respectively fixed and variable frequency outputs, means producing a voltage varying in accordance with said relative motion of the system, said third generator being arranged to vary its output frequency in proportion to said varying voltage, a second group of three phase shifting means serially connected to said second frequency generator and operative to reproduce its output in phase quadrature components, four detector circuits including signal mixing means respectively receiving the output of said second generator in phase quadrature, said signal mixing means also receiving the output of said third generator so that conduction among the detectors rotates at a rate responsive to the frequency difference of the second and third generators, means coupling each detector circuit to an appropriate one of said vacuum tube amplifiers to produce rotating conduction therein, and means for combining the output of said mutual output means with the echo pulses.

3. In a radio echo moving object detection system of the class described in which the echo signals resulting from each pulse transmission are balanced against the corresponding echo signals resulting from the immediately preceding pulse transmission, and in which a locally generated signal having a fixed phase relationship to the transmitted pulse is vectorially added to the echo signals before the same are so balanced, a means for compensating for the motion imparted to the radio echo system comprising, phase shift means for splitting said locally generated signal into a plurality of progressively phase shifted components, means for recombining said phase shifted components into a resultant signal, said last named means including a plurality of channels equal in number to the number of phase shifted components, each operative to receive a corresponding one of the said phase shifted components, and means for sequentially increasing the conductance of said channels in accordance with the sense and speech of movement of said radio echo system relative to the target under observation, said last named means comprising a fixed frequency oscillator and a variable frequency oscillator, the frequency of said variable frequency oscillator being varied in accordance with said motion imparted to the system, and means for controlling the rate of sequential conduction of said channels in accordance with the frequency difference between said fixed and variable frequency oscillators.

4. In a radio echo moving object detection system of the class described in which the echo signals resulting from each pulse transmission are balanced against the corresponding echo signals resulting from the immediately preceding pulse transmission, and in which a locally generated signal having a fixed phase relationship to the transmitted pulse is vectorially added to the echo signals before the same are so balanced, a means for compensating for the motion imparted to the radio echo system comprising phase shift means for splitting said locally generated signal into four phase quadrature components, means for recombining said phase quadrature components into a resultant signal, said last named means including four channels each operative to receive a corresponding one of said phase quadrature components, and means for sequentially increasing the conductance of said channels in accordance with the sense and speed of movement of said radio echo system relative to the target under observation, said last named means comprising a fixed frequency oscillator and a variable frequency oscillator, the frequency of said variable frequency oscillator being varied in accordance with said motion imparted to the system, and means for controlling the rate of sequential conduction of said channels in accordance with the frequency difference between said fixed and variable frequency oscillators.

5. In a radio echo moving object detection system of the class described in which the echo signals resulting from each pulse transmission are balanced against the corresponding echo signals resulting from the immediately preceding pulse transmission, and in which a locally generated signal having a fixed phase relationship to the transmitted pulse is vectorially added to the echo signals before the same are so balanced, a means for compensating for the motion imparted to the radio echo system comprising phase shift means for splitting said locally generated signal into four phase quadrature components, means for recombining said phase quadrature components into a resultant signal, said last named means including four channels each operative to receive a corresponding one of said phase quadrature components, a first oscillator whose frequency is fixed, a second oscillator whose frequency is governed by the speed of movement of the radio echo system and the angle at which said system is moving relative to the target under consideration, means splitting the signal output from said first oscillator into four phase quadrature components, means vectorially combining the output signal of said second oscillator with each of said phase quadrature components of said first oscillator whereby a separate control signal for each of said channels is produced, means increasing the conductance of each of said channels responsive to the corresponding control signal whereby the resultant output signal therefrom is given a phase rotation.

6. In a radio echo moving object detection system of the class described in which the echo signals resulting from each pulse transmission are balanced against the corresponding echo signals resulting from the immediately preceding pulse transmission, and in which a locally generated signal having a fixed phase relationship to the transmitted pulse is vectorially added to the echo signals before the same are so balanced, a means for compensating for the motion imparted to the radio echo system comprising phase shift means for splitting said locally generated signal into four phase quadrature components, means for recombining said phase quadrature components into a resultant signal, said last named means including four channels each operative to receive a corresponding one of said phase quadrature components, means producing a voltage signal whose magnitude is a function of the speed of the radio echo system and the angle of its movement relative to a target under observation, a first oscillator whose frequency is fixed, a second oscillator whose frequency is controlled by said voltage signal, means splitting the signal output from said first oscillator into four phase quadrature components, means vectorially combining the output signal of said second oscillator with each of said phase quadrature components of said first oscillator whereby a separate control signal for each of said channels is produced, means increasing the conductance of each of said channels responsive to the corresponding control signal whereby the resultant output signal therefrom is given a phase rotation.

7. A phase rotation circuit comprising, means splitting the signal whose phase is to be rotated into four phase quadrature components, means for recombining said phase quadrature components into a resultant signal, including four vacuum tubes whose outputs are connected in parallel, means coupling to the input of each of said vacuum tubes a corresponding one of said phase quadrature components, two oscillator means, and phase shift means associated with one of said oscillator means for splitting the output thereof into four phase quadrature components, and control means for varying the frequency of the other oscillator, four coincidence detector circuits each having one output and two inputs and each having its output connected to one of said vacuum tubes, each detector circuit having one input connected to one of the phase quadrature components of said one oscillator and the other input connected in parallel to said other oscillator whereby the conducting characteristics of each of said vacuum tubes are changed in sequence in accordance with the frequency difference between said oscillators to thereby give a phase rotation to the resultant output of said tubes.

References Cited by the Examiner

UNITED STATES PATENTS

| | | | |
|---|---|---|---|
| 2,085,940 | 7/1937 | Armstrong | 323—119 |
| 2,316,155 | 4/1943 | Crosby | 323—119 |
| 2,337,272 | 12/1943 | Roberts | 332—16 X |
| 2,424,971 | 8/1947 | Davey | 250—27 |
| 2,525,089 | 10/1950 | Blumlein | 343—8 |
| 2,547,028 | 4/1951 | Libby et al. | 343—121 |
| 2,548,779 | 4/1951 | Emslie | 343—7.7 |
| 2,678,440 | 5/1954 | Watt | 343—7.7 |
| 2,754,506 | 7/1956 | Page | 343—7.7 |

CHESTER L. JUSTUS, *Primary Examiner.*

NORMAN H. EVANS, FREDERICK M. STRADER,
*Examiners.*

M. KARR, M. A. MORRISON, R. A. KUYPERS, R. D. BENNETT, *Assistant Examiners.*